Patented Mar. 2, 1954

2,671,114

UNITED STATES PATENT OFFICE 2,671,114

BIS-HYDRONOPYL ETHER AND PRODUCTION THEREOF

Vladimir N. Ipatieff and Herman Pines, Chicago, Ill., assignors to Universal Oil Products Company, Chicago, Ill., a corporation of Delaware No Drawing. Application July 31, 1951, Serial No. 239,634

4 Claims. (Cl. 260—611)

This invention relates to bis-hydronopyl ether and to a process for its production.

An object of this invention is the production of bis-hydronopyl ether.

One embodiment of this invention relates to bis-hydronopyl ether as a new composition of matter.

Another embodiment of this invention relates to a process for preparing bis-hydronopyl ether which comprises partially dehydrating hydronopol.

A further embodiment of this invention relates to a process for preparing bis-hydronopyl ether which comprises reacting hydronopol and hydrogen at a temperature of from about 150° to about 250° C. in the presence of a nickel-alumina catalyst.

We have found that a substantial yield of bis-hydronopyl ether is produced when hydronopyl is reacted in the presence of hydrogen and of a nickel-alumina catalyst at a temperature of from about 150° to about 250° C. Other catalysts which are useful in this process in the presence or absence of hydrogen are only mildly acidic and include alumina, a dilute aqueous solution of an alkali metal chloride, such as calcium chloride and magnesium chloride, containing from about 0.5 to about 5% by weight of the alkali metal chloride, and also a nickel-alumina catalyst prepared, for example, by reducing a composite of 77% by weight of nickel oxide and 23% by weight of alumina as prepared by the method disclosed by V. N. Ipatieff, W. W. Thompson, and H. Pines, J. Am. Chem. Soc. 73, 553 (1951).

Bis-hydronopyl ether is also produced by carrying out the partial dehydration of hydronopol in the presence of a diluent including normally liquid saturated hydrocarbon such as pentane, cyclohexane, etc., and also in the presence of a substantially inert gaseous diluent such as hydrogen, methane, ethane, etc. The dehydration treatment is carried out in the presence of one or more of the above indicated catalysts, and preferably in the presence of hydrogen so that one molecular proportion of water is removed from two molecular proportions of hydronopol.

The hydronopol used as starting material in this process was produced from commercially available nopol which was hydrogenated at a temperature of from about 80° to about 90° C. and at a pressure of 100 atmospheres of hydrogen in the presence of a nickel-diatomaceous earth catalyst. The reactions utilized in producing bis-hydronopol ether are illustrated by the following equations:

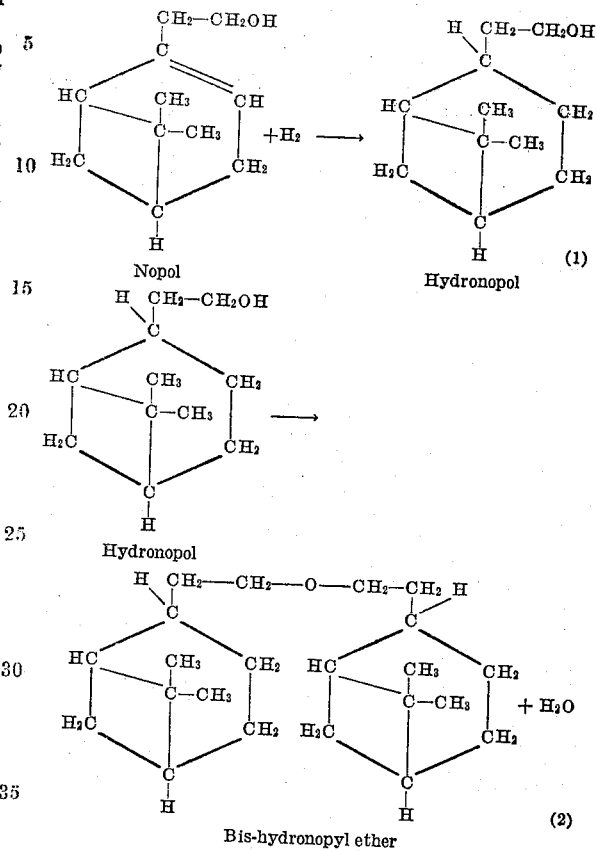

The bis-hydronopyl ether is a new composition of matter which is useful as a solvent for resinous materials formed from terpenic hydrocarbons, as a base useful in the production of perfumes and as an intermediate in the production of medicinals, insecticides, and the like.

The nature of this invention is illustrated further by the following example which, however, is given with no intention of limiting unduly the generally broad scope of the invention.

Nopol having a boiling point of 118–118.5° C. at 10 mm. pressure and an index of refraction, $n_D^{20}$, 1.4940 was dissolved in pentane and reacted with hydrogen at a temperature of 80–90° C. at 100 atmospheres pressure in the presence of a nickel-diatomaceous earth catalyst. This hydrogenation treatment converted the nopol into almost a theoretical yield of hydronopol which distilled at 128–129° C. at a pressure of 12 mm. of mercury and had a refractive index, $n_D^{20}$, of 1.4890.

The stainless steel autoclave of 450 cc. capacity was charged with 43 grams of hydronopol and 4.3 grams of a nickel-alumina catalyst prepared by reducing a composite of 77% NiO and 23% Al₂O₃. The autoclave was then placed under an initial pressure of 62 atmospheres of hydrogen and the autoclave and contents were rotated and heated at a temperature of 200° C. for a time of 5 hours. At the end of this time of reaction, the autoclave pressure was 51 atmospheres. The autoclave was then permitted to cool, the hydrogen was released from the autoclave, and the normally liquid reaction products were recovered and investigated. It was found that 55% of the hydronopol had undergone conversion and that 23% of the hydronopol had been converted into pinene and that about 22% of the hydronopol had been converted into bis-hydronopyl ether. The bis-hydronopyl ether so obtained boiled at a temperature of 200–205° C. at a pressure of 4 mm. of mercury and had an index of refraction of $n_D^{20}$, of 1.4942; and $D_4^{20}$, 0.9545. Analysis of the bis-hydronopyl ether gave the following results:

*Anal.*—Calcd. for $C_{22}H_{38}O$: C, 83.02; H, 11.95; $MR_D$ 96.64. Found: C, 82.80; H, 12.23; $MR_D$ 97.02.

We claim as our invention:

1. Bis-hydronopyl ether.
2. A process for preparing bis-hydronopyl ether which comprises partially dehydrating hydronopol.
3. A process for producing bis-hydronopyl ether which comprises reacting hydronopol and hydrogen in the presence of an alumina catalyst at a temperature of from about 150° to about 250° C.
4. A process for producing bis-hydronopyl ether which comprises reacting hydronopol and hydrogen in the presence of a nickel-alumina catalyst at a temperature of from about 150° to about 250° C.

VLADIMIR N. IPATIEFF.
HERMAN PINES.

References Cited in the file of this patent

UNITED STATES PATENTS

| Number | Name | Date |
|---|---|---|
| 2,014,408 | Woodhouse | Sept. 17, 1935 |
| 2,358,314 | Bruson | Sept. 19, 1944 |
| 2,360,898 | Sarbach | Oct. 24, 1944 |